J. A. SMITH.
EGG TURNOVER PAN.
APPLICATION FILED APR. 19, 1921.

1,398,655.

Patented Nov. 29, 1921.

Witness
Lynn Latta

Inventor
Jesse A. Smith
By Bair & Freeman
Attorneys

UNITED STATES PATENT OFFICE.

JESSE A. SMITH, OF DES MOINES, IOWA.

EGG-TURNOVER PAN.

1,398,655.  Specification of Letters Patent.  Patented Nov. 29, 1921.

Application filed April 19, 1921. Serial No. 462,620.

*To all whom it may concern:*

Be it known that I, JESSE A. SMITH, a citizen of the United States, residing at Des Moines, in the county of Polk and State of Iowa, have invented a certain new and useful Egg-Turnover Pan, of which the following is a specification.

The object of my invention is to provide a frying pan having a lip thereon so that the slight jerking of the handle of the pan in a predetermined direction will cause the contents of the pan to slide upwardly against the lip of the pan thereby causing the contents of the pan to "flop over".

Still a further object is to provide a frying pan comprising a body portion made of a single piece of material and provided with an over hanging lip which is curved in cross section so that by engaging the handle of the pan and applying a jerky motion thereto, the contents of the pan will be slid against the lip and turned over.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1:
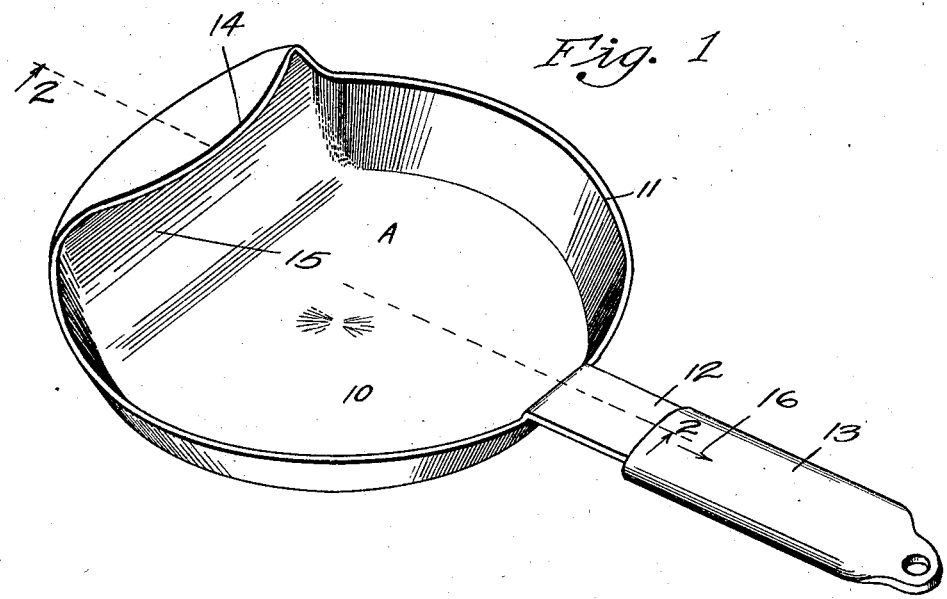
Figure 1 is a perspective view of my improved frying pan.
Figure 2:
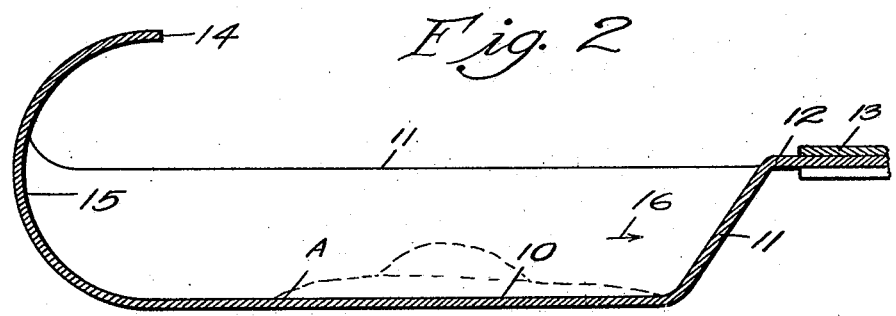
Fig. 2 is a central, sectional view taken on the line 2—2 of Fig. 1.

In the accompanying drawings I have used the reference character A to indicate generally the body of a frying pan which is preferably made of a single piece of material, and provided with a bottom 10 and an upwardly and outwardly peripheral flange 11.

A tongue 12 is formed from a portion of the flange 11 and extends outwardly away from the flange 11 so as to provide a handle.

The tongue 12 is covered with a casing or covering 13 which may be grasped by the hand and will not be affected by the heat of the tongue 12.

The parts just described are of the ordinary construction.

At the opposite side of the flange 11 from the tongue 12 is provided an over hanging lip 14 which has its upper free edge over a portion of the bottom 10 of the pan, substantially as illustrated in the drawings.

The over hanging lip 14 provides a surface 15, the purpose of which will be hereafter more fully set forth.

In the practical use of my frying pan, an egg may be placed in the pan and when one side has been partially cooked and it is desired to turn the egg over, the jerking or pulling of the pan in the direction indicated by the arrow 16 will cause the egg within the pan to slide against the surface 15 of the lip 14.

The sudden movement of the pan will impart such a force to the contents of the pan as to cause it to follow the surface 15 of the lip 14 and when the contents of the pan is again on the bottom 10 it will have been completely turned over.

It will be understood that the grease used in frying permits the easy free sliding movement of the contents of the pan.

It will be seen that with the use of my pan an egg or any other object that is being cooked by what is known as the frying process may easily and readily be turned over by applying a sudden jerk to the pan and having the contents thereof slid upwardly and over the surface 15 of the lip 14.

Some changes may be made in the construction and arrangement of the parts of my machine without departing from the real spirit and purpose of my invention, and it is my intention to cover by my claims, any modified forms of structure or use of mechanical equivalents, which may be reasonably included within their scope.

I claim as my invention:

1. In a device of the class described, a frying pan having a lip thereon, said lip being curved in cross section and having its free edge arranged so that it extends over the bottom of the pan, the parts being so adapted that a sudden jerk of the pan will cause the contents thereof to be slid against the lip and to position where it will be turned over for the purposes stated.

2. In combination with a frying pan, a contents turn over device formed from the flange of the pan, the turn over device consisting of a portion curved in cross section and having its lower edge flush with the bottom of the pan and having its upper edge spaced over the bottom of the pan, the parts being so arranged that a sudden jerk of the pan in a predetermined position will cause the contents thereof to slide against the turn over device and to position where it will be turned over all for the purposes stated.

Des Moines, Iowa, April 11th, 1921.

JESSE A. SMITH.